United States Patent Office.

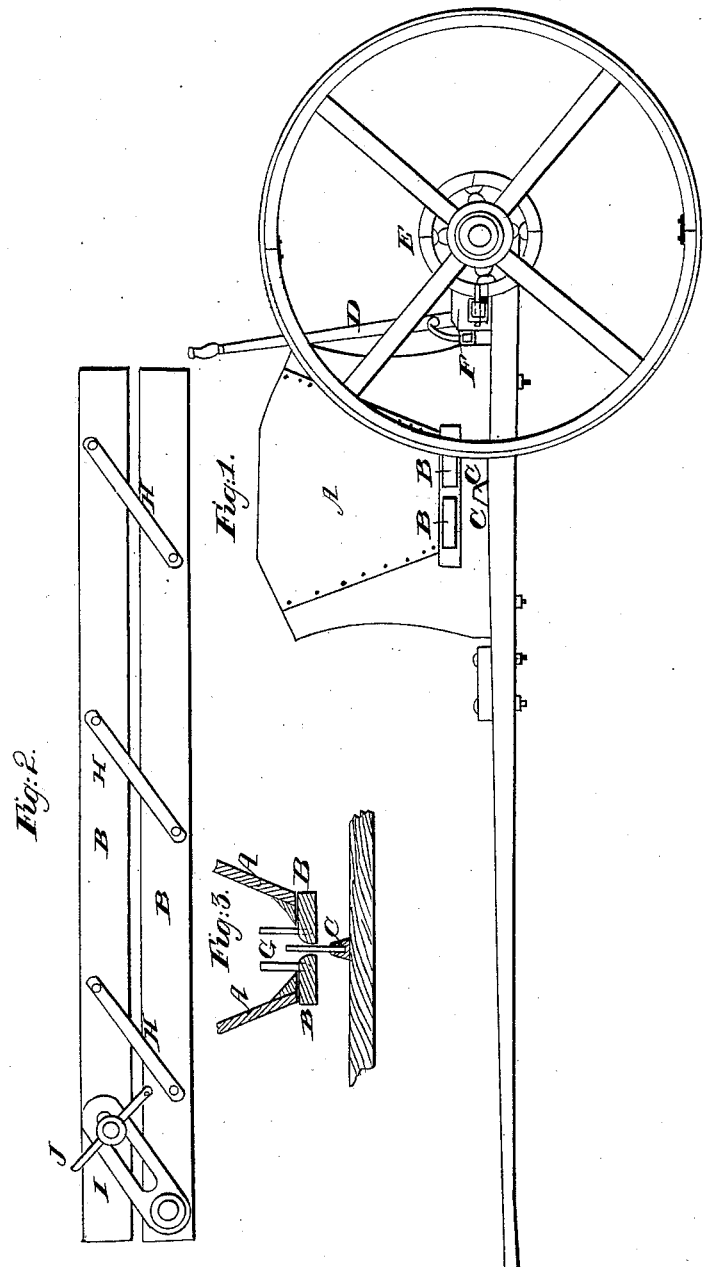

BENJAMIN F. HORTON, OF ITHACA, NEW YORK.

*Letters Patent No. 61,201, dated January 15, 1867.*

IMPROVEMENT IN SEEDING MACHINES.

*The Schedule referred to in these Letters Patent and making part of the same.*

TO ALL WHOM IT MAY CONCERN:

Be it known that I, BENJAMIN F. HORTON, of Ithaca, Tompkins county, New York, have invented an Improved Seeding Machine; and I do hereby declare that the following is a full and exact description thereof, reference being had to the annexed drawings, and to the letters of reference marked thereon.

Figure 1 is a side view of my machine: and
Figures 2 and 3 are parts thereof.

My object is to make a very simple machine, effective and little liable to get out of order. To accomplish this, I use wheels and thills and their necessary accompanying parts. To one of the wheels, or both, if necessary, I attach a metallic zigzag cam, and make connection from it to a vibrating or shaking slide under the box holding the seed, and thus I jar out the seed broadcast or into ordinary drill tubes. I make my shaking slide or apparatus of three bars, one stationary, with metallic studs, and running under the whole length of the seed-box, and the other two adjustable, but, when set, fixed in relation to each other and moving together. These also have one or more series of metallic studs, and also reach the whole length of the seed-box. Thus I make a simple and very useful machine.

In Figure 1, A is the seed-box, held by suitable means to the thills or other convenient part of the carriage, and B B the two vibrating bars under the seed-box, and C is the stationary bar beneath the vibrating slide or bars, and E the zigzag cam on the hub of one of the wheels, and F the connecting-rod, with pins or studs on each side of the zigzag cam, moving the vibrating bars, and D is the lever that throws the rod F in and out of gear from and to the cam.

In the Figure 2 is seen the under side of the sliding bars. The cross metallic rods H H H are hinged at each end to the bars, and hold the bars in constant parallelism to each other, so that a longitudinal and adjustable opening is made between the two bars. The clamp I is hinged at one end, and has the set-screw J in a slot in it. Its action is to set and fix the rods and vibrating bars in relation to each other, and when so set the two rods are moved or vibrated together alike, the adjustment being made to suit the wheat, oats, or other seed or article to be sown.

In Figure 3, A A is the lower part of the seed-box, and B B a section of the vibrating bars, and C a section of the stationary stud-bar. The series of studs in the longitudinal opening between the vibrating bars is seen by one of the studs; the other series of studs is seen fixed in vibrating bars. For the sake of convenience and cheapness I make my seeding machine so that by removing the teeth of a wheeled rake I apply it to the carriage and use it in combination therewith; and further make the zigzag cam adjustable to the wheels of the said rakes by set-screws or other means.

The use of the machine is apparent to those skilled in the art to which it appertains, and is, that the seed or other article is put in the seed-box, after the vibrating bars have been set to suit it, by the clamp and set-screws I and J, and when the operator desires to sow the seed he throws the vibrating bars in gear with the zigzag cam, when the seed is scattered uniformly; and when, as in backing, going around obstacles, turning about, he wishes to move the machine and not sow the seed, he throws the vibrating bars out of connection with the cam.

Claim.

1. I claim the combination and use of the stationary bar C with the two movable bars or slides B B when made as described, and the use therewith of one or more series of studs in the opening between the bars, or immediately connected with the said opening.

2. I claim the bars B B, when held in constant parallelism with each other by means of the rods H H H, thus securing a uniform and adjustable opening between the bars and the even sowing of the seed; and I claim the set-clamp I and its set-screw J for the purpose of adjusting the opening for the sowing of various seeds or articles.

3. I claim the arrangement of the studs G, one series on the fixed bar C, and at least one on the vibrating bars B B.

4. I claim the combination of the wheeled carriage, the cam E, seed-box, vibrating bars, stationary bar, gear lever, when made as described, the same constituting one whole or machine.

5. I claim the making of the zigzag cam adjustable by set-screws, so that it can be applied to the wheels of the horse rakes, and the use of my machine in combination with the wheels and carriage of horse rakes, as shown and described.

BENJAMIN F. HORTON.

Witnesses:
SAMUEL J. PARKER,
S. W. SMITH.